United States Patent [19]

Nakajima

[11] Patent Number: 4,875,173
[45] Date of Patent: Oct. 17, 1989

[54] IMAGE ENLARGING METHOD AND DEVICE

[75] Inventor: Akio Nakajima, Toyokawa, Japan

[73] Assignee: Minolta Camera Kabushiki Kaisha, Osaka, Japan

[21] Appl. No.: 852,439

[22] Filed: Apr. 15, 1986

[30] Foreign Application Priority Data

Apr. 16, 1985 [JP] Japan .................................. 60-81913
Apr. 16, 1985 [JP] Japan .................................. 60-81914

[51] Int. Cl.⁴ .............................................. G06F 3/15
[52] U.S. Cl. .................................... 364/518; 340/799; 340/800
[58] Field of Search ............................. 364/518–522; 382/45, 47; 340/747, 798–800

[56] References Cited

U.S. PATENT DOCUMENTS

| | | | |
|---|---|---|---|
| 3,816,664 | 6/1974 | Koch | 381/30 |
| 4,370,524 | 1/1983 | Hiraguri | 381/29 |
| 4,545,070 | 10/1985 | Miyagawa et al. | 382/48 |
| 4,555,801 | 11/1985 | Miyagawa et al. | 382/45 |
| 4,631,751 | 12/1986 | Anderson et al. | 382/47 |
| 4,675,811 | 6/1987 | Kishi et al. | 364/200 |
| 4,682,243 | 7/1987 | Hatayama | 382/47 |
| 4,694,288 | 9/1987 | Harada | 340/747 X |
| 4,695,966 | 9/1987 | Takaura et al. | 364/521 |

*Primary Examiner*—Gary V. Harkcom
*Assistant Examiner*—H. R. Herndon
*Attorney, Agent, or Firm*—Price, Gess & Ubell

[57] ABSTRACT

A method and device for enlarging an image of digital data which is stored in a memory. The data consisting of one line of the image is read out from the memory and is written again in the memory with different ratio from a ratio of reading in order to enlarge the image. The entire data of the image stored in a certain area of the memory is shifted to another area thereof without interfering an enlargement procedure. The enlargement procedures are repeated plural times to obtain most adequate magnification for designated magnification.

12 Claims, 5 Drawing Sheets

FIG. 4
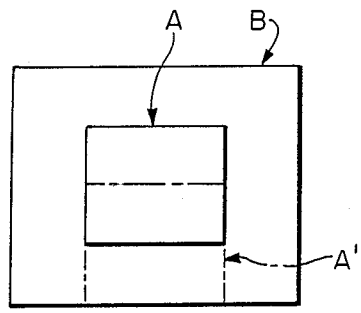
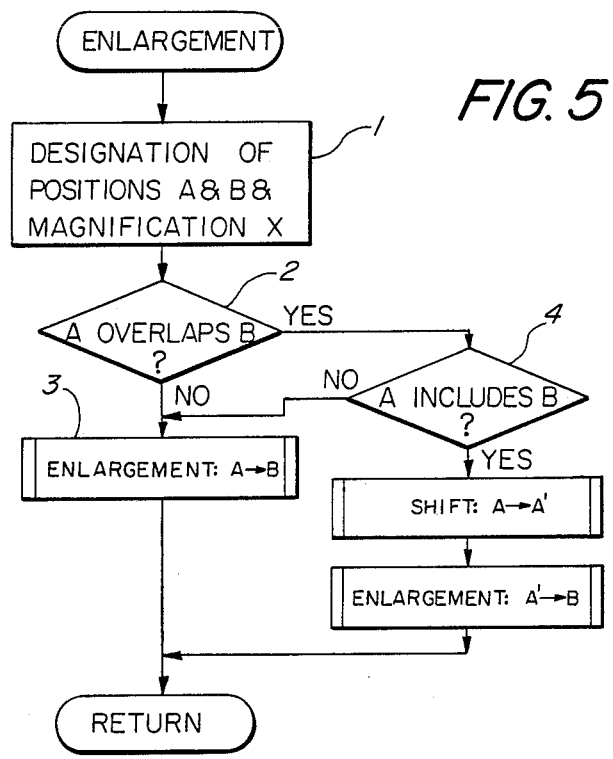
FIG. 5

ORIGINAL IMAGE

FIRST ENLARGED IMAGE $\left(\times \frac{256}{N_1}\right)$

SECOND ENLARGED IMAGE $\left(\times \frac{256}{N_2}\right)$

IMAGE ENLARGING METHOD AND DEVICE

FIELD OF THE INVENTION

The present invention relates to an image enlarging method and a device for use in an image processing apparatus for enlarging, rotating, composing, editing or otherwise processing input images and delivering the resulting image data as an output.

BACKGROUND OF THE INVENTION

Image processing apparatus generally have an internal memory for storing image data from a hard disc or like external memory or an image reader and are adapted to process the image data stored in the internal memory in various modes and deliver the processed data to a display or printer.

For enlargement, the stored image is read out from the internal memory, enlarged and stored again in the internal memory at a specified address. When the read-out image data is temporarily stored in a buffer memory, the image data can be enlarged when the data is stored in the buffer memory or when it is returned from the buffer memory to the internal memory.

The buffer memory to be used has a capacity to store a line or several lines of data. Although it is possible to use a buffer memory having a capacity to store an amount of data to be displayed which can include an entire screen of the display at a time, an increased cost will then result.

When a buffer memory with a capacity of one line is used, image data is read out from the internal memory simultaneously with rewriting of the enlarged data. It is therefore likely that the original stored image will be broken owing to the relation between the location of the original image in the internal memory and the location where the enlarged image is written.

This will be described with reference to FIG. 1, which shows the storage area of the internal memory two-dimensionally in a state in which the stored image is to shown on a display. It is now assumed that the original image data is stored in region A and is to be stored in region B as enlarged twofold. To enlarge the image, the data is read out first from the uppermost line $A_1$ of region A, then enlarged and stored first in the uppermost line $B_1$ of region B. The data in lines $A_1$ to $A_{i-1}$ of region A can be properly restored in lines $B_1$ to $B_{i-1}$ of region B. At this time, lines $A_{i-2}$ and $A_{i-1}$ coincide with line $B_{i-1}$ in the internal memory. When line $A_i$ is subsequently enlarged and written in line $B_i$, line $A_{i+1}$ from which the original data is to be read out is also replaced by the enlarged data. Consequently, the enlarged image portion in lines $A_{i+1}$ et seq. differs from the original image portion.

The process of enlargement will be described next. Enlargement is accomplished by an electrical process in which the ratio of the speed at which image data is written in the buffer memory to the speed at which the image data is read from the buffer memory is varied. Suppose the writing speed is 256 clock pulses (M) per unit time, and the reading speed is N clock pulses ($64 \leq N \leq 256$). The magnification of $M/N = 1X$ to $4X$ is then variable in 193 steps. In this case, however, the magnification is dependent on the value N, which is entered by the user, so that it is difficult for the user to recognize the actual magnification. Further the magnification obtained varies stepwise with the value N, and an intermediate magnification value is not available. For example, when a magnification of 1.700X is required, an N value of 150 or 151 gives a magnification approximate to this value, i.e., 1.707X or 1.695X.

SUMMARY OF THE INVENTION

Accordingly, the main object of the present invention is to provide a method of enlarging images accurately with high fidelity and a device therefor which is easy to operate.

Another object of the present invention is to provide an image enlarging method and device in which a buffer memory of small capacity is usable without entailing any break of images.

Another object of the present invention is to provide an electrical image enlarging method and device by which a desired magnification can be obtained.

These and other objects can be fulfilled by the following method.

In reading out image data from a memory having stored therein the image to be enlarged and returning the image data to the memory on enlargement, the image to be enlarged is first shifted within the memory to a position not to interfere with enlargement and thereafter enlarged when the image data is likely to be broken.

The image is enlarged by varying the ratio of the speed at which the image data is written in a buffer memory to the speed at which the data is read out therefrom. This enlarging procedure is executed a plurality of times, whereby the image is enlarged at a desired magnification entered. The data for determining the magnification for each time is determined by calculation or from a data table calculated and stored in advance.

BRIEF DESCRIPTION OF THE DRAWINGS

These and other objects or features of the present invention will become apparent from the following description of a preferred embodiment thereof taken in conjunction with the accompanying drawings, in which:

FIG. 4 is a diagram illustrating a shift of image according to the present invention;

FIG. 5 is a flow chart showing the enlarging procedure of the present invention;

In the following description, like parts are designated by like reference numbers throughout the several drawings.

DESCRIPTION OF THE PREFERRED EMBODIMENT

Figure 1:
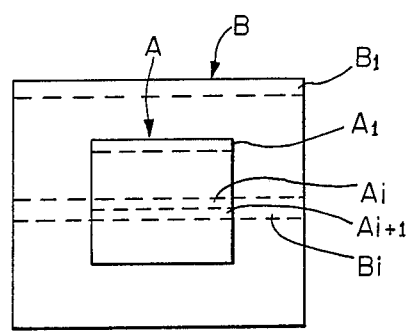
FIG. 1 is a diagram for illustrating a break of image which is likely to occur when the image is enlarged.
Figure 2:
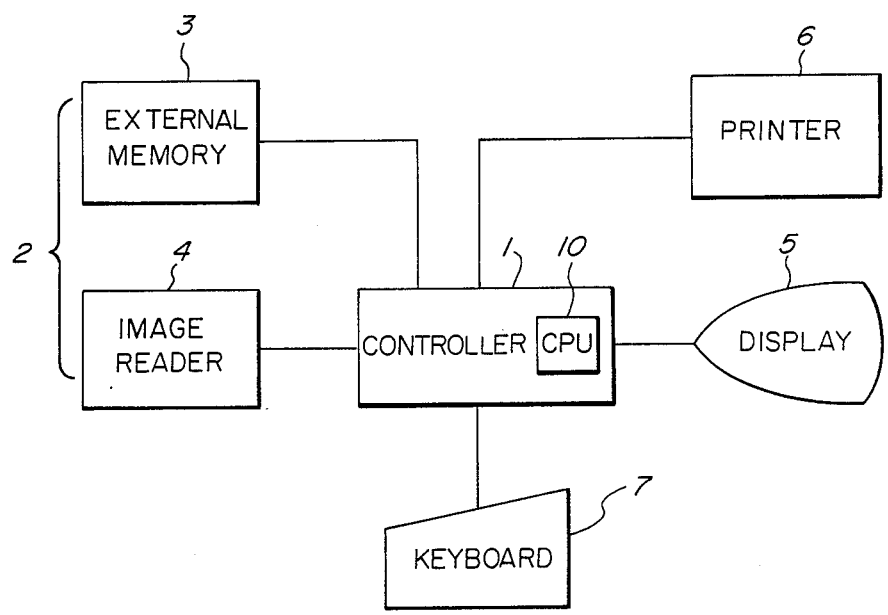
FIG. 2 is a block diagram schematically showing an image processing apparatus embodying the present invention.

With reference to FIG. 2, an image processing apparatus embodying the present invention will be described generally. The image processing apparatus comprises a control system 1, a unit 2 for feeding image data to a memory within the control system 1, a display 5, a printer 6, and a keyboard 7 for entering instructions for processing images. The unit 2 is, for example, an external memory 3 such as a hard disc or an image reader 4 for reading images from documents to produce digital data. These components may be in the form of a single assembly or assemblies.

Figure 3:
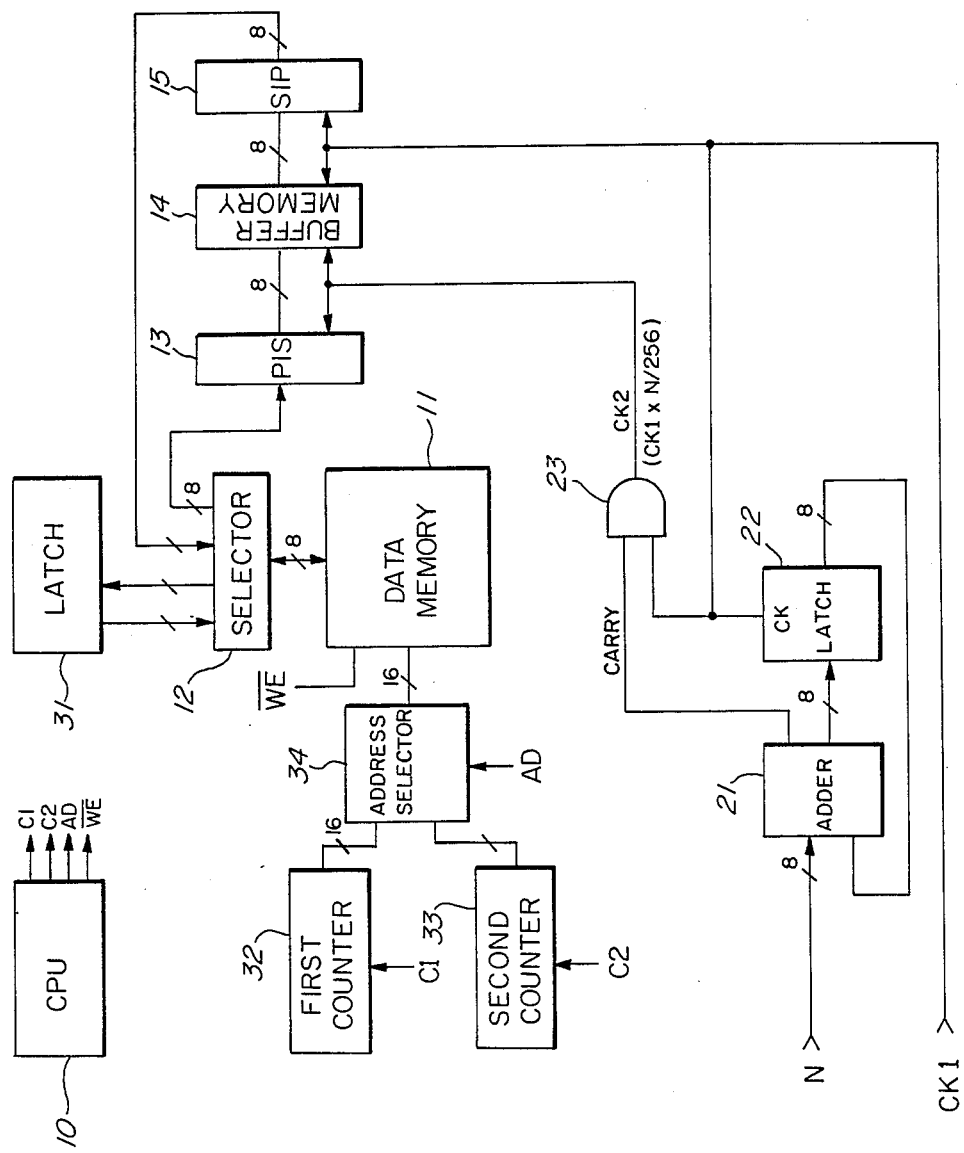
FIG. 3 is a diagram showing an image enlarging circuit included in a control system 1.

The control system 1 includes a central processing unit (CPU) 10, which controls an enlarging procedure according to the flow chart to be described later. With reference to FIG. 3 which shows an image enlarging circuit embodying the invention and included in the control system 1, a memory 11 has stored therein an amount of image data (8-bit data) to be shown on the screen of the display at a time and forwarded from the data input unit 2. The memory 11 is connected to a selector 12. The image data read out from the memory 11 is stored in a buffer memory 14 via the selector 12 and a parallel-serial converter 13. The data read out from the buffer memory 14 is stored in the memory 11 again via a serial-parallel converter 15. The buffer memory 14 has a storage capacity corresponding to one line on the display.

A specified number of clock pulses CK1 (256) are fed to the buffer memory 14 and the serial-parallel converter 15, while a variable number of clock pulses CK2 are fed to the buffer memory 14 and the parallel-serial converter 13.

The clock pulses CK2 are generated by a circuit comprising an adder 21, a latch 22 and an AND gate 23. A value N ($64 \leq N \leq 256$) for determining the magnification is fed to one input terminal of the adder 21. An output signal from the latch 22 is applied to the other input terminal of the adder 21. The output timing of the latch 22 is given by the clock pulses CK1. The result of addition by the adder 21 is fed to the latch 22. The adder 21 produces a CARRY signal when the result of addition reaches 256. The CARRY signal is fed to one input terminal of the AND gate 23. The clock pulses CK1 are applied to the other input terminal of the AND gate 23. Accordingly, the clock pulses CK2 are an AND output of the CARRY signal and the clock pulses CK1, i.e., a clock signal corresponding to N/256 times the clock signal CK1. These two signals CK1 and CK2 control the buffer memory 14 for data writing and reading, whereby the data in the memory 11 can be enlarged. The magnification is determined by CK1/CK2. The bit data read out from the memory 11 is written in the buffer memory 14 in response to the clock signal CK2, and concurrently with this, data bits are read out from the buffer memory 14 and written in the memory 11 in response to the clock signal CK1. In corresponding relation to whether a CARRY signal is emitted or not, newly read-out bit data or the previously read-out data is written in the memory 11, whereby the bit data is enlarged at a ratio of CK1/CK2 on the average. While the above circuit enlarges the image in the direction of lines, the image is similarly enlarged in the direction of columns by an unillustrated circuit.

A latch 31 is connected to the selector 12, and first and second counters 32, 33 are connected to the memory 11 via an address selector 34. Under the control of the CPU 10, these latch 31, first and second counters 32, 33 and address selector 34 shift the image data on the memory 11 to a location where the data will not interfere with the enlarging processing. The CPU 10 successively gives the first counter 32 the addresses of the area where the data is stored before shifting and gives the second counter 33 the addresses of the area to which the data is to be shifted. When the image data is to be shifted, the address selector 34 delivers the former address from the first counter 32 to the address terminal of the memory 11 in response to a selection signal from the CPU 10. Subsequently, a reading signal is given to $\overline{WE}$ terminal, whereupon the contents of the address are stored in the latch 31 via the selector 12. Next, in response to a selection signal from the CPU 10, the address selector 34 delivers the latter address from the second counter 33 to the address terminal of the memory 11. A writing signal is then given to the $\overline{WE}$ terminal, whereupon the contents of the latch 31 are stored in the memory 11 at the specified address via the selector 12. The above procedure is repeated to shift the image data on the memory 11. More specifically, the image area A to be enlarged is shifted in the memory area to the end, opposite to the enlargement starting end, of an area B where the enlarged image is to be stored (e.g., to the position of the lowermost line of the area B when enlargement is started from the uppermost line). This shift of the image area is shown in FIG. 4. With reference to FIG. 4, the image area A to be enlarged is shifted to the lowermost side of the area B where the enlarged image is to be stored, i.e., to an area A' indicated in broken line. The data thus shifted can be enlarged without any break.

FIG. 5 is a flow chart showing the relation between the shift of image and the enlarging procedure.

When the image is to be enlarged, the original position A of the image to be enlarged, the position B of the image as enlarged and a magnification X are entered by the keyboard in step 1. Next, step 2 checks whether the specified positions A and B overlap each other. If there is no overlap, there is no likelihood of the image breaking, so that step 3 immediately follows for enlargement. When there is an overlap, step 4 determines whether the image will be broken if enlarged as it is, by checking whether the position A is included in the position B. When it is included, it is very likely that the image will be broken. Accordingly, the image is shifted from position A to position A' in step 5, and the image in the position A' is enlarged at the position B in step 6. If the answer to the interrogation of step 4 is NO, step 3 follows. Alternatively, step 4 may be omitted.

In order to obtain a magnification most approximate to the keyed-in magnification, the image is enlarged at least two times according to the present invention.

Figure 6:
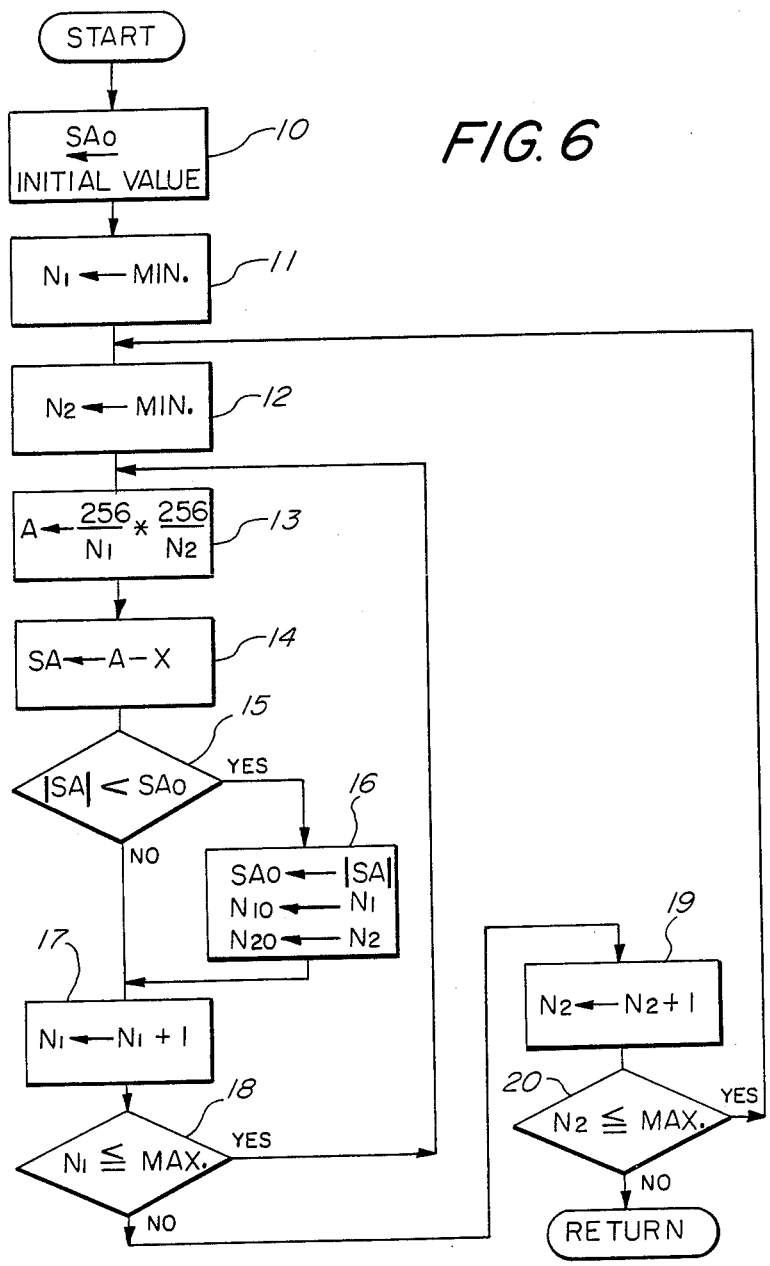
FIG. 6 is a flow chart illustrating calculations for determining magnifications for use in enlarging an image according to the invention.

FIG. 6 is a flow chart showing the steps of calculating clock signal CK2 values N1 and N2 from the specified magnification X for use in the first enlargement and the second enlargement.

Referring to FIG. 6, a value SAo indicating an allowable range of magnification errors is set in step 10. The allowable magnification error SAo may be a suitable predetermined value or may be specified with an input.

In the following steps 11 and 12, the values N1 and N2 are set to a minimum. With the present embodiment, the value N is in the range of $64 \leq N \leq 256$, so that both values N1 and N2 are set to 64.

The calculation of $(256/N1) \times (256/N2)$ is performed in the next step 13 to obtain a value A. In step 14, the difference between the calculated magnification A and the specified magnification X is calculated to obtain a value SA. The value SA is compared with the allowable magnification error SAo in step 15, which is followed by step 17 if the value SA is greater than the error SAo. If the value SA is smaller than the error SAo, the absolute value of the value SA is renewed to the value of the error SAo, and the values N1, N2 used for the calculation are designated as values N10, N20.

In step 17, the value N1 is increased by an increment of 1. The following step 18 checks whether the value N1 is smaller than the maximum (256). When the result is YES, the sequence returns to step 13. If the result is NO, i.e., if the value N1 is the maximum, step 19 follows in which the value N2 is increased by an increment of 1. The next step 20 checks whether the value N2 is smaller than the maximum. When the result is YES, the sequence proceeds to step 12. If the result is NO, the sequence returns to the main flow since the entire calculation is completed.

According to the flow of FIG. 6, every combination of N1 and N2 is calculated to obtain the values N10 and N20 for giving the magnification SAo which is most approximate to the specified magnification X. For example, N1 and N2 for giving the above-mentioned magnification 1.700X are 244 and 158, respectively.

Figure 7A:
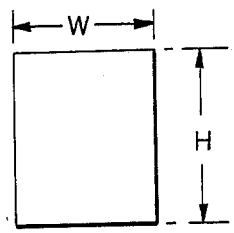
FIGS. 7a-7c show the steps of obtaining a desired magnification by enlarging the image twice.
Figure 7B:
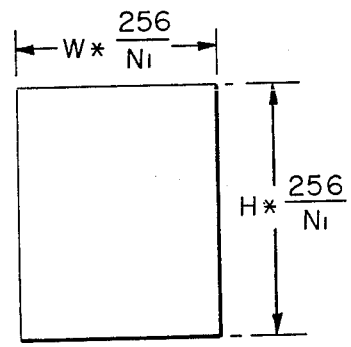
Figure 7C:
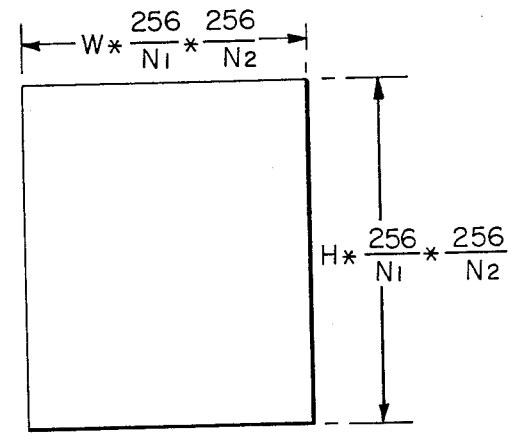

FIGS. 7 (a), (b) and (c) show how the image is enlarged twice at the magnifications determined by the process of FIG. 6. The original image having a width W and a height H as shown in FIG. 7 (a) is enlarged first at 256/N1 X as shown in FIG. 7 (b) using the value N1 for the clock signal CK2, and then enlarged to the size shown in FIG. 7 (c) at 256/N2 X using the value N2 for the clock signal CK2.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image enlarging method for use in an image processing apparatus which processes an image stored as digital data in an internal memory so as to enlarge the image to a designated magnification, the method comprising the steps of:
   (A) shifting the image data representative of one line stored in a predetermined area of the internal memory to another predetermined area of the internal memory to avoid any interference with a subsequent enlargement procedure, and
   (B) enlarging the image data, representative of one line shifted by step (A), wherein each data representative of one line is transmitted from the internal memory to a temporary memory and is returned again to the internal memory after the image data has been enlarged in the temporary memory or while the image data is being returned to the internal memory.

2. An image enlarging method as claimed in claim 1, wherein step (A) includes the steps of:
   (A1) determining, before a shifting the image data in the internal memory, whether or not the image data not yet read out of the internal memory will interfere with the image data to be read out of and returned to the internal memory after enlargement if the shift of the image data is not executed, and
   (A2) executing the shifting procedure when it is determined that interference will occur.

3. An image enlarging method as claimed in claim 1, wherein step (B) executes the enlargement procedure by transmitting the image data from the internal memory to the temporary memory at a first speed and by returning the image data from the temporary memory to the internal memory at an equal or faster second speed, whereby the image data is enlarged by virtue of the image data being replicated in the internal memory a multiplicity of times before subsequent image data is transmitted from the internal memory to the temporary memory.

4. An image enlarging method as claimed in claim 1, wherein the enlargement procedure of step (B) is performed a plurality of times at equal or different rates of enlargement in order to obtain the designated magnification.

5. A method of enlarging an image represented by digital data to a designated magnification in a manner that the image data stored in a memory is read out line by line and is returned again to the memory as enlarged to a certain magnification, and where such an enlargement procedure is repeated a plurality of times at equal or different magnification values, the method comprising the steps of:
   (A) determining a set of magnification values which is the most adequate set among possible sets of magnification values by comparing a plurality of sets of magnification values with the designated magnification in order to ascertain which set most nearly approaches the designated magnification when the magnification values comprising the set are employed in a plurality of enlargement procedures, and
   (B) executing the plurality of enlargement procedures in succession by using respective magnification values from the set determined as the most adequate set in step (A).

6. A method as claimed in claim 5, wherein step (A) includes the steps of:
   (A1) multiplying magnification values constituting all respective possible sets with each other to thereby obtain a plurality of products, and
   (A2) selecting the set which most nearly approaches the designated magnification by comparing the products of step (A1) with the designated magnification.

7. A method as claimed in claim 5, wherein step (A) determines the most adequate set from a data table which stores magnification values constituting respective possible sets and products thereof in advance.

8. A device for enlarging an image of digital data comprising:
   an internal memory storing therein the entirety of the image data;
   a buffer memory for temporarily storing data of one line which is part of the entire data;
   first means for transmitting the data from the internal memory to the buffer memory by one line;
   second means for transmitting the data from the buffer memory to the internal memory;
   third means connected to the first and second data transmitting means for supplying two values concerning the data transmitting speed, said two values being different from each other and being established in accordance with a designated magnification;
   means for controlling the first to third means so as to execute an enlargement procedure in which the data is transmitted to the buffer memory at a first speed and read out from the buffer memory and returned to the internal memory at a second speed greater than or equal to the first speed, whereby the data is enlarged by virtue of the data being replicated in the internal memory a multiplicity of times before subsequent data is transmitted from the internal memory to the buffer memory, and means for shifting the entire image data stored in a certain area of the data memory to another area thereof where no interference with the enlargement procedure will occur.

9. A device as claimed in claim 8, wherein one of said two values is constant and the other thereof is variable in accordance with the designated magnification.

10. A device for enlarging an image represented by digital data comprising:

an internal memory storing therein the entirety of the image data;

a buffer memory for temporarily storing data representative of one line which is only a part of the entire data;

first means for transmitting the data from the internal memory to the buffer memory by one line at a time;

second means for transmitting the data back from the buffer memory to the internal memory;

third means connected to the first and second data transmitting means for supplying two values concerning the data transmitting speeds of the first and second data transmitting means, said two values being different from each other;

means for determining plural sets of the two values for achieving a final designated enlargement value;

means for controlling the first to third means so as to execute a plurality of enlargement procedures in which the data is transmitted from the internal memory to the buffer memory at a first speed and read out from the buffer memory and returned to the internal memory at a second speed greater than or equal to the first speed, whereby the data is enlarged by virtue of the data being replicated in the internal memory a multiplicity of times before subsequent data is transmitted from the internal memory to the buffer memory, and means for executing each of the enlargement procedures in succession, wherein each of the enlargement procedures is executed by using one of the sets of values to result in the achievement of the final designated magnification.

11. A device as claimed in claim 10, wherein one of said two values is constant and the other thereof is variable.

12. Apparatus with limited memory capabilities for enlarging an image represented by digital data in order to provide a magnified image thereof comprising:

memory means for storing the data representative of the image;

means for defining the original position of the image to be enlarged;

means for defining the magnification of the image;

means for defining the resultant position of the desired magnified image displaced from the original position;

means for shifting the original position to another position when there is an overlap of the defined enlarged image position and the original position, and means for transmitting data of the magnified image for storage in the same memory means whereby a magnified image is provided without loss of content and with limited use of memory capability.

* * * * *